March 2, 1971     A. WENDT     3,566,510
METHOD OF MAKING EXPANSION JOINT FOR FLUID CONDUITS Filed Jan. 29, 1969     2 Sheets-Sheet 1

Alfred Wendt
INVENTOR.

BY Karl G. Ross
Attorney

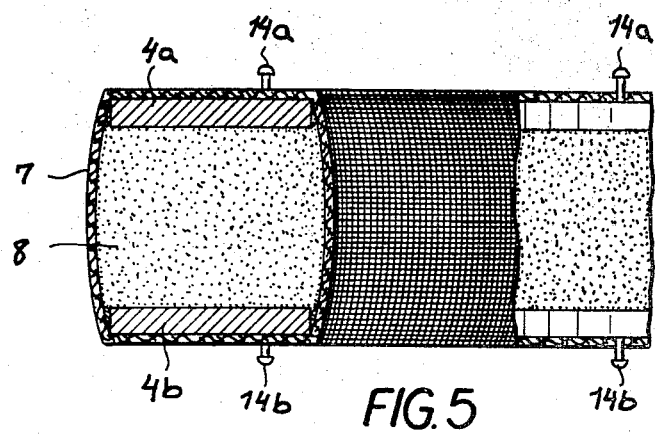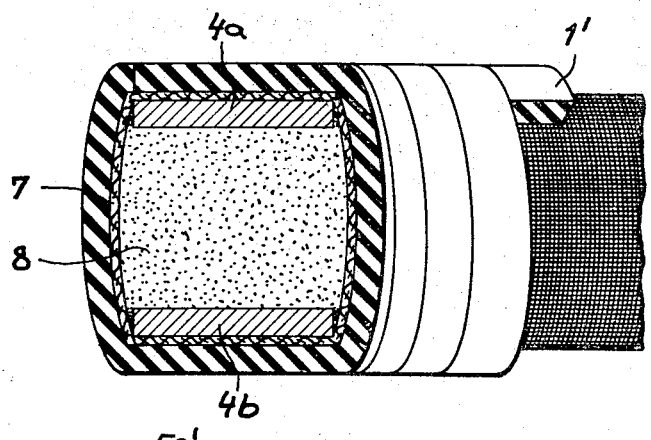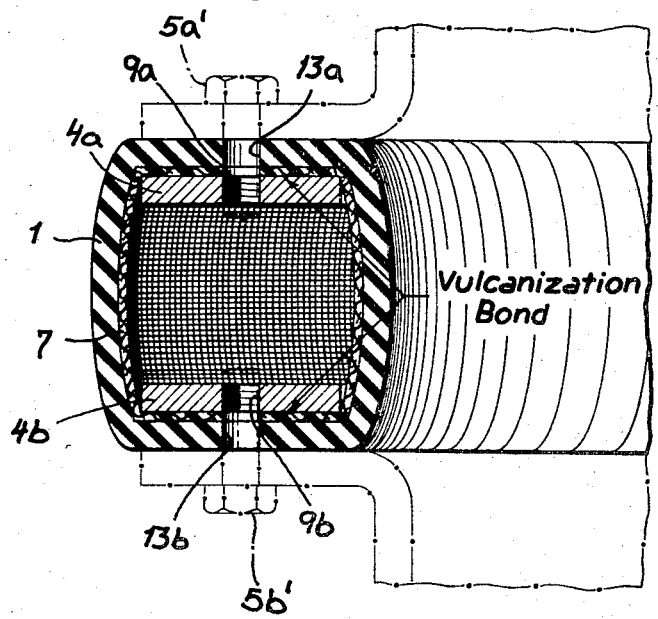

United States Patent Office 3,566,510
Patented Mar. 2, 1971

3,566,510
METHOD OF MAKING EXPANSION JOINT FOR FLUID CONDUITS
Alfred Wendt, Oberhausen, Germany, assignor to Kempchen & Co. G.m.b.H., Oberhausen Rhineland, Germany
Filed Jan. 29, 1969, Ser. No. 794,852
Claims priority, application Germany, Feb. 1, 1968, P 16 75 329.0
Int. Cl. B23p 17/00
U.S. Cl. 29—423                                5 Claims

ABSTRACT OF THE DISCLOSURE

An expansion joint interconnecting a pair of flanged pipes comprises a toroidal compensator tube of fluid-impermeable elastic material enclosing two metallic rings which are substantially coextensive with the adjoining pipe flanges and are fastened thereto in a fluidtight manner by screws traversing the tube wall. To dispose the two metal rings inside the compensator tube, the rings are coaxially placed on opposite sides of a toroidal body of sand or other flowable bulk material held in position by a tubular liner of fabric or the like which is then enshrouded in a sheath of elastomeric material molded therearound; holes are thereafter formed in the elastomeric sheath and the liner to accommodate fastening screws engaging the rings, whereupon the bulk material is discharged from the interior of the compensator tube through some of these holes prior to insertion of the screws. The rings are advantageously bonded, preferably by vulcanization, to the inner tube wall.

My present invention relates to a flexible compensator designed to form an expansion joint between two substantially coaxial pipes with confronting flanges forming part of a conduit system for the circulation of fluids.

Compensators of this type must be capable of withstanding changing temperatures and the resulting variations in axial pressure which tend to widen or to narrow the gap between the flanges; in some instances they must also resist chemical attack from the conveyed fluid. Above all, they must form fluidtight joints with the adjacent flange faces without yielding to radial fluid pressure.

My invention aims at providing a compensator capable of being installed by a simple means between a pair of flanged pipes to form an expansion joint satisfying all the above-listed requirements, and of being just as readily removed when the joint is to be disassembled. Another important object is to provide a method of conveniently and expeditiously making such a compensator.

In accordance with the present invention, I provide a toroidal tube of flexible, preferably elastic fluid-impermeable material, such as natural or synthetic rubber with or without internal reinforcements, in whose interior I dispose a pair of rigid annular members, advantageously two flat metallic rings, which are substantially coextensive with the pipe flanges between which the tube is to be inserted. To these annular members I attach the respective pipe flanges with the aid of bolts or equivalent fastening means penetrating the tube wall in a fluidtight manner.

The clamping action of the fastening bolts may be supplemented by an adhesive bond between the inner wall surface of the toroidal tube and the encased ring members. When the tube material is a vulcanizable elastomer, this bond is advantageously achieved by vulcanization of a toroidal sheath molded around the two rings.

Pursuant to another feature of my invention, I form the tube around the two rings by substantially coaxially disposing the latter on opposite sides of a toroidal body of flowable bulk material, such as sand, with exposure of opposite faces of the rings (e.g. at the top and the bottom); for easier handling, the body may be wrapped in a liner of flexible material, such as a fabric, which should be sufficiently pervious to permit contact between the rings and the polymer layer forming the surrounding tube so as to facilitate bonding. Next, the curable (e.g. vulcanizable) polymeric material is deposited, advantageously as a wound strip, around the toroidal body and is fused, by curing, into a coherent sheath, with application of sufficient contact pressure to bond the rings to the inner sheath surface. Holes are then drilled into the two rings through the tube and the liner, if any, in a pattern aligning them with corresponding perforations in the associated pipe flanges. Now, the sand or other bulk material can be discharged from the interior of the tube through some of these drilled holes, whereupon the holes of the rings are tapped to receive the fastening bolts securing them to the flanges. If desired, compression springs or similar resilient elements may be interposed between these rings to urge them axially apart, the springs being then also initially imbedded in the body of flowable bulk material. The mutual bonding of the rings and the tube maintains their relative position upon removal of the fasteners to dismantle the joint, thereby simplifying their subsequent reassembly.

The invention will be described in greater detail with reference to the accompanying drawing in which:

FIGS. 5, 6 and 7 are further views generally similar to FIG. 2, illustrating successive steps in the manufacture of an expansion joint according to my invention.

Figure 1:
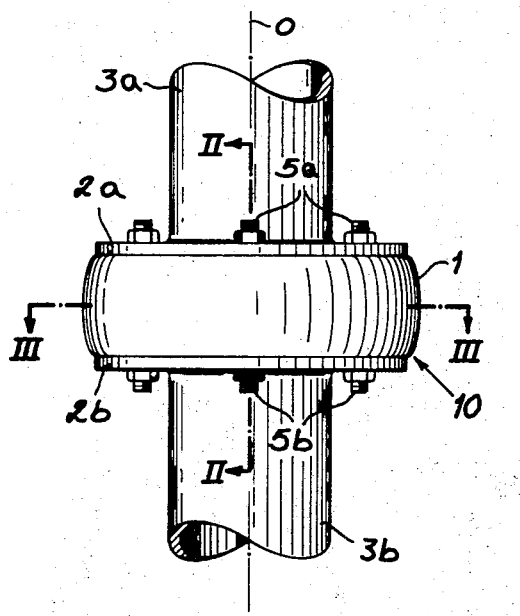
FIG. 1 is a side-elevational view of an expansion joint for a pair of pipe including a compensator according to the invention.
Figure 3:
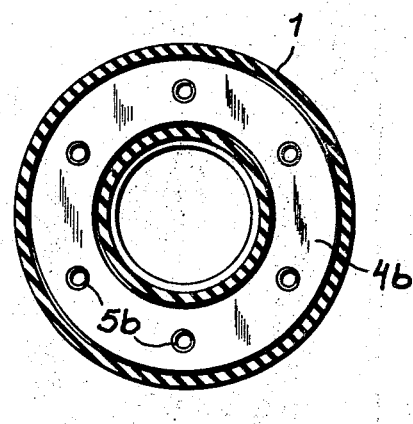
FIG. 3 is a cross-sectional view taken on the line III—III of FIG. 1.
Figure 2:
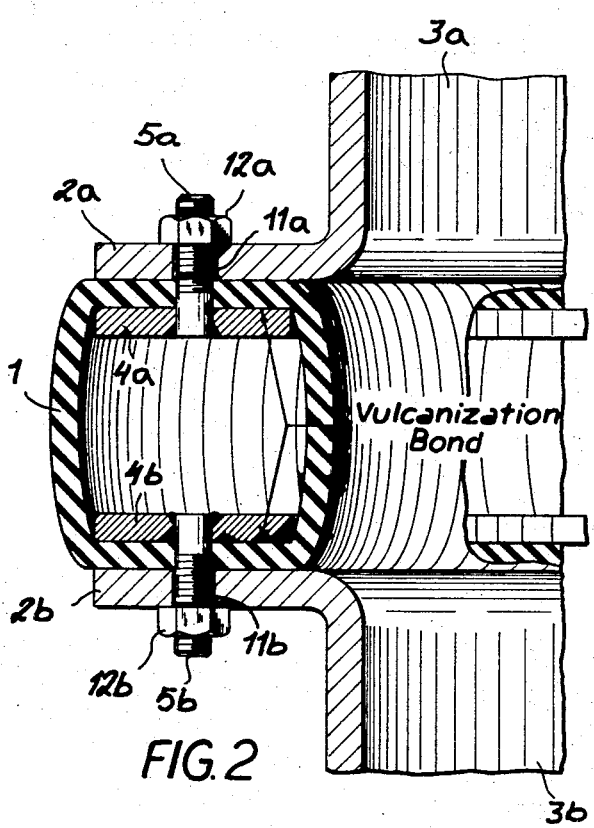
FIG. 2 is a fragmentary sectional view, drawn to a larger scale, on the line II—II of FIG. 1.

In FIGS. 1–3 I have illustrated an expansion joint 10 formed between a pair of pipes 3a, 3b with a common axis 0 having confronting end flanges 2a, 2b. These flanges are provided at peripherally spaced locations with holes 11a, 11b traversed by respective bolts 5a, 5b which hold the joint 10 in position and are secured by nuts 12a, 12b.

The joint 10 comprises a toroidal tube 1 of elastomeric material, e.g. natural rubber, encasing a pair of flat metal rings 4a, 4b which are disposed in its interior in axially spaced relationship and in substantial registry with the flanges 2a and 2b. In the embodiment shown in FIG. 2, the bolts 5a, 5b are respectively rigid with rings 4a and 5b to which they may be fixed by soldering or welding. As further indicated in FIG. 2, the rings 4a and 4b may be adhesively bonded (e.g. through vulcanization) onto the adjoining inner wall surfaces of tube 1. Even without such bonding, the tube 1 is tightly clamped between the flanges 2a, 2b and the rings 4a, 4b to prevent any fluid leakage through the joint.

Figure 4:
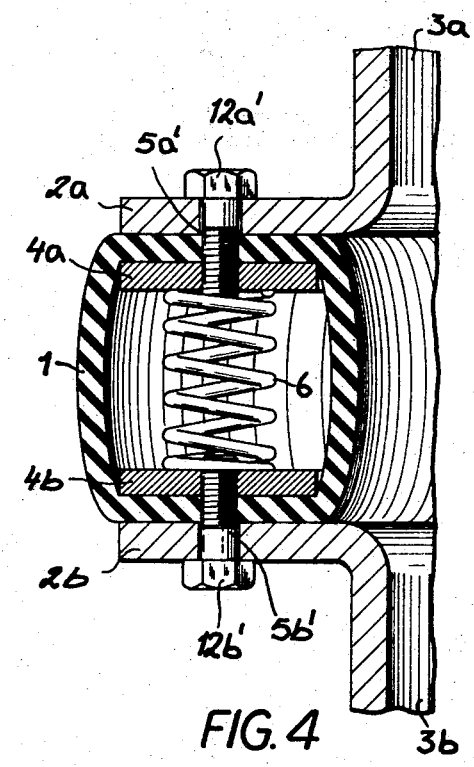
FIG. 4 is a view similar to FIG. 2, showing a modification.

As illustrated in FIG. 4, compression springs 6 (only one shown) may be interposed at peripherally spaced locations between the rings 4a and 4b to help maintain their axial separation and to supplement the elasticity of tube 1 in resisting a flattening of that tube under axial pressures tending to narrow the gap between flanges 2a and 2b. FIG. 4 further illustrates the replacement of bolts 5a and 5b, rigid with rings 4a and 4b, by bolts 5a′, 5b′ which are inserted from without through the aligned perforations of flanges 2a, 2b, tube 1 and rings 4a, 4b, the perforations of the rings being threaded for engagement with the shanks of the bolts whose heads 12a′, 12b′ bear upon the exposed flange surfaces. The inwardly projecting shank ends of these bolts help maintain the springs 6 in their assigned positions.

In FIGS. 5–7 I have illustrated a convenient method of forming the tube 1 around the rings 4a, 4b in accordance with the present invention. Pursuant to this method I initially separate the two rings 4a and 4b by a toroidal body 8 of flowable bulk material, such as sand, this body being substantially coaxial with the two rings which may be partly embedded in the sand but whose opposite faces are exposed. The rings are preferably imperforate at this stage and may be held apart by springs 6 (FIG. 4) or equivalent resilient means imbedded in the sand body 8. A thin tubular liner 7, e.g. of textile fabric, may be sewn around the body 8 and the rings 4a, 4b or otherwise secured thereto in enveloping fashion to hold the assembly temporarily together, as shown in FIG. 5.

Next, as illustrated in FIG. 6, a substantially solid layer 1' of curable elastomeric material is deposited on the outside of liner 7, e.g. as a strip wound helically therearound. This layer is subsequently fused into a continuous sheath representing the toroidal tube 1, as illustrated in FIG. 7, the fusion being brought about by vulcanization or some other curing process which advantageously also bonds the cured polymer to the rings 4a and 4b through the interstices of liner 7. Alternatively, the formation of the tube 1 around the assembly of FIG. 5 could be carried out in a conventional split mold.

Either before or after the curing step, preferably the latter, peripherally spaced holes 13a, 9a and 13b, 9b are drilled in the tube 1 and in the rings 4a, 4b with concurrent perforation of the interposed liner 7. After this drilling operation, which proceeds against the reaction force of the sand body 8 and of the stiffening springs 6, if any, the sand may be drained out through the lower holes 13b, 9b whereupon the bores 9a, 9b may be tapped for engagement by external bolts 5a', 5b' in the manner illustrated in FIG. 4. During the tapping operation the tube 1 may be compressed so that the rings 4a and 4b lie flat against each other, with their bores 9a and 9b in registry for joint penetration and threading by the tapping tool. The original drilling of the se bores is advantageously carried out with the aid of a template having apertures peripherally spaced by the same distance as the holes 11a, 11b (FIG. 2) of the flanges 2a, 2b.

If desired, the adhesion between the flanges and the rings may be enhanced by supplemental coupling formations, such as studs 14a, 14b (FIG. 5) rising from the exposed ring surfaces, which imbed themselves in the surrounding polymeric material.

I claim:
1. A method of making a fluidtight expansion joint between a pair of substantially coaxial pipes having confronting flanges with peripherally spaced holes, comprising the steps of spacedly disposing a pair of substantially coextensive rigid annular members with relative axial mobility inside the bore of a toroidal tube of flexible fluid-impermeable material, forming sets of aligned bores alignable with said holes in said members and in adjoining wall portions of said tube, inserting said tube between said flanges with said bores and holes in mutual alignment, passing fasteners through said aligned bores, and interconnecting said flanges and corresponding members by said fasteners in a fluidtight manner.

2. A method as defined in claim 1 wherein said members are originally placed on opposite sides of toroidal body of flowable bulk material in substantially coaxial relationship with said body, said tube being thereupon formed about said body and said members, said bulk material being subsequently discharged from the interior of said tube through at least some of said holes before introduction of said fasteners into same.

3. A method as defined in claim 2 wherein said bulk material is initially encased in a pervious flexible liner, said tube being formed from a layer of elastomeric material deposited externally on said liner.

4. A method as defined in claim 3 wherein said elastomeric material is deposited in a substantially solid but curable state as a strip wound about said liner and is subsequently fused into a coherent sheath by curing.

5. A method as defined in claim 1 wherein said fluid-impermeable material is a vulcanizable elastomer, further comprising the step of bonding said members internally to said tube by vulcanizing said elastomer in contact with said members.

References Cited

UNITED STATES PATENTS

| 1,948,211 | 2/1934 | Fritz | 285—49X |
| 2,267,085 | 12/1941 | Dezendorf | 285—49 |
| 2,833,029 | 5/1948 | Kearns | 29—423 |
| 2,977,919 | 4/1961 | Blake | 285—49X |
| 3,012,315 | 12/1961 | Stillwagon | 29—423 |
| 3,290,762 | 12/1966 | Ayuzawa et al. | 29—423X |

FOREIGN PATENTS 547,375  8/1942  Great Britain _____ 285—49

CHARLIE T. MOON, Primary Examiner

U.S. Cl. X.R.

29—436, 445, 463; 285—49